United States Patent
Ishigaki et al.

(10) Patent No.: US 9,696,575 B2
(45) Date of Patent: Jul. 4, 2017

(54) DISPLAY DEVICE AND MANUFACTURING METHOD THEREOF

(71) Applicant: Japan Display Inc., Tokyo (JP)

(72) Inventors: Toshimasa Ishigaki, Tokyo (JP); Daisuke Sonoda, Tokyo (JP); Tatsuya Ide, Tokyo (JP); Koji Ishizaki, Tokyo (JP); Yoshihiro Watanabe, Tokyo (JP); Hayato Kurasawa, Tokyo (JP); Masanobu Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 51 days.

(21) Appl. No.: 14/727,701

(22) Filed: Jun. 1, 2015

(65) Prior Publication Data
US 2015/0346531 A1    Dec. 3, 2015

(30) Foreign Application Priority Data

Jun. 2, 2014 (JP) .................................. 2014-113905

(51) Int. Cl.
*G02F 1/1333* (2006.01)
*G02F 1/1341* (2006.01)

(52) U.S. Cl.
CPC ........ *G02F 1/13338* (2013.01); *G02F 1/1341* (2013.01); *G02F 2201/38* (2013.01); *G02F 2201/50* (2013.01)

(58) Field of Classification Search
CPC .................................................. G02F 1/13338
See application file for complete search history.

(56) References Cited

U.S. PATENT DOCUMENTS

| | | | | |
|---|---|---|---|---|
| 5,470,691 A | * | 11/1995 | Arai | B41J 3/4071 347/106 |
| 5,541,770 A | * | 7/1996 | Pellicori | H01J 29/868 359/585 |
| 6,099,783 A | * | 8/2000 | Scranton | B29C 35/0888 264/272.11 |
| 2003/0129535 A1 | * | 7/2003 | Tzou | G03F 7/038 430/280.1 |
| 2009/0266621 A1 | * | 10/2009 | Huang | G06F 3/044 178/18.01 |
| 2012/0162584 A1 | * | 6/2012 | Chang | G06F 3/0412 349/106 |
| 2013/0188104 A1 | | 7/2013 | Aoki et al. | |
| 2014/0024280 A1 | * | 1/2014 | Wu | G02F 1/13338 445/24 |

FOREIGN PATENT DOCUMENTS

JP    2013-152291 A    8/2013

* cited by examiner

*Primary Examiner* — Phu Vu
(74) *Attorney, Agent, or Firm* — Typha IP LLC

(57) ABSTRACT

Detection electrode wirings formed by an ITO film have a high resistance and the detection capability thereof is degraded with the increase of the size and/or resolution. A manufacturing method of a display device includes: (a) arranging liquid crystal between an array substrate and a counter substrate; (b) forming a metal layer and a low-reflection layer on the counter substrate after the step (a); (c) applying an overcoat film onto the metal layer and the low-reflection layer; and (d) curing the overcoat film to form a protection layer. The step (d) cures the overcoat film with light and heat.

20 Claims, 18 Drawing Sheets

DISPLAY DEVICE AND MANUFACTURING METHOD THEREOF

CLAIM OF PRIORITY

The present application claims priority from Japanese patent application No. JP2014-113905 filed on Jun. 2, 2014, the content of which is hereby incorporated by reference into this application.

BACKGROUND

This disclosure relates to a display device and can be applied to a display device having an in-cell touch panel, for example.

Japanese Patent Application Laid-Open Publication No. 2013-152291 (Patent Literature 1) discloses the following. In a liquid crystal display device having an in-cell touch panel, a bock-side transparent conductive film on the second substrate (color filter substrate), formed by a transparent conductive film such as an ITO film, is divided into strips to form detection electrodes of the touch panel, and a counter substrate formed inside the first substrate (TFT substrate) is divided into strips, i.e., a plurality of blocks to be used also as scanning electrodes of the touch panel. In this manner, a touch panel substrate is omitted.

SUMMARY

The detection electrode wirings formed by an ITO film as described in Patent Literature 1 have a high resistance, and the detection capability thereof is degraded with the increase of the size and/or resolution.

Other problems and novel features will become apparent from the description of this disclosure and the accompanying drawings.

The outline of a typical part of this disclosure is briefly described below.

A manufacturing method of a display device includes: (a) arranging liquid crystal between an array substrate and a counter substrate; (b) forming a metal layer and a low-reflection layer on the counter substrate after the step (a); (c) applying an overcoat film on the metal layer and the low-reflection layer; and (d) curing the overcoat film to form a protection layer.

DESCRIPTION OF THE PREFERRED EMBODIMENTS

Figure 1:
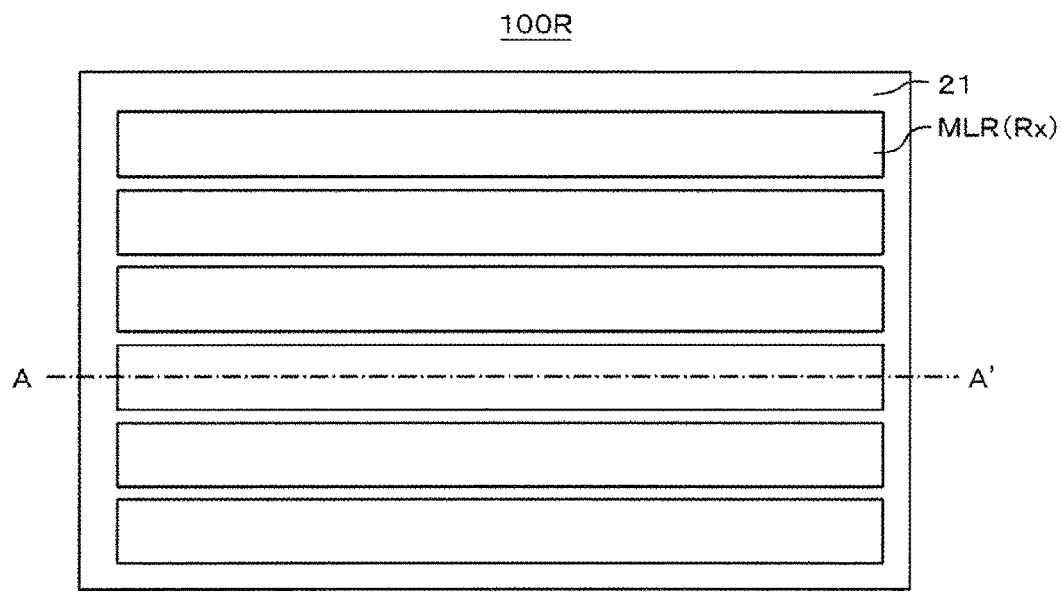
FIG. 1 is a plan view for explanation of a display device according to the first comparative example.

Comparative examples and an example are described below, referring to the drawings. The disclosure is merely an example, and modifications that could be easily conceived by a person skilled in the art as appropriate while keeping the summary of the invention should be contained in the scope of the present invention. The drawings may show the width, thickness, shape, or the like of each component more schematically as compared with that in an actual embodiment for clarifying more the description, but merely show an example and are not intended to limit the interpretation of the present invention. Moreover, in this specification and each drawing, the same components as those described in connection with a drawing referred to before are labeled with the same reference signs, and the detailed description thereof may be omitted as appropriate.

First Comparative Example

First, the first technique (the first comparative example) it is considered before making the invention of this disclosure is described, referring to FIGS. 1 to 5.

Figure 2:
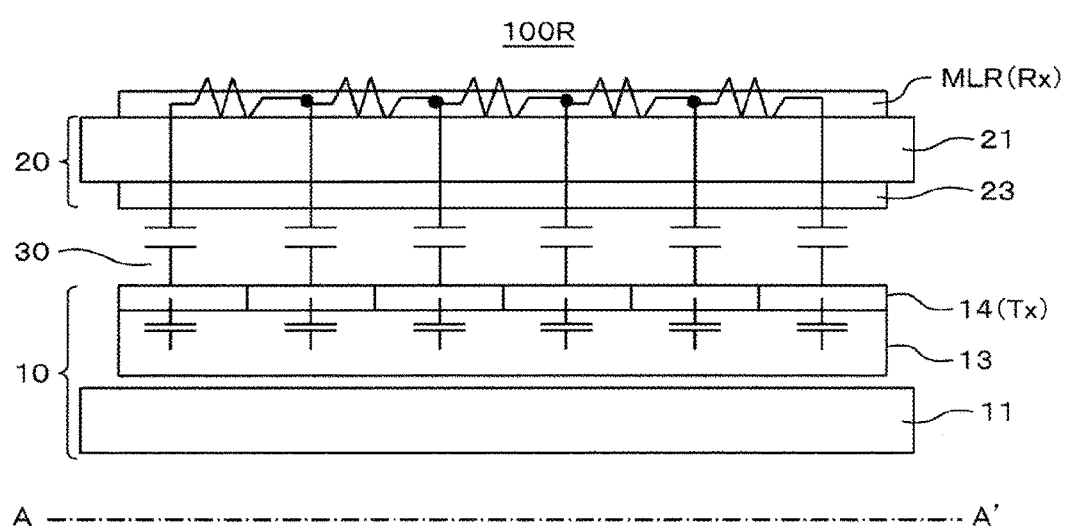
FIG. 2 is a cross-sectional view, taken along line A-A' in FIG. 1.
Figure 3:
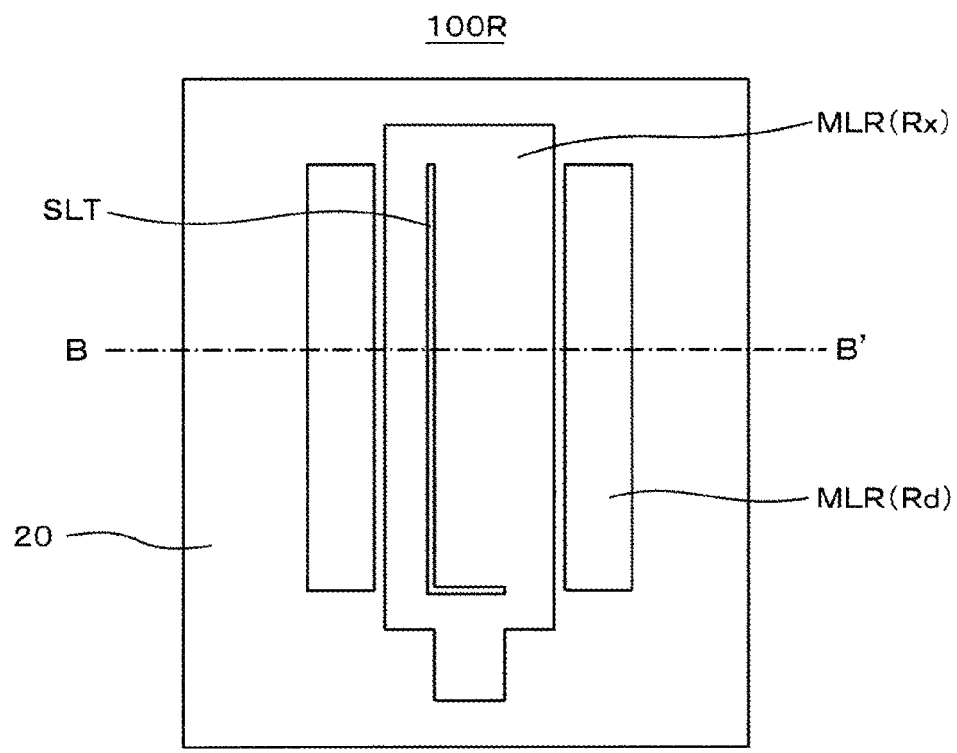
FIG. 3 is a plan view for explanation of the display device according to the first comparative example.
Figure 4:
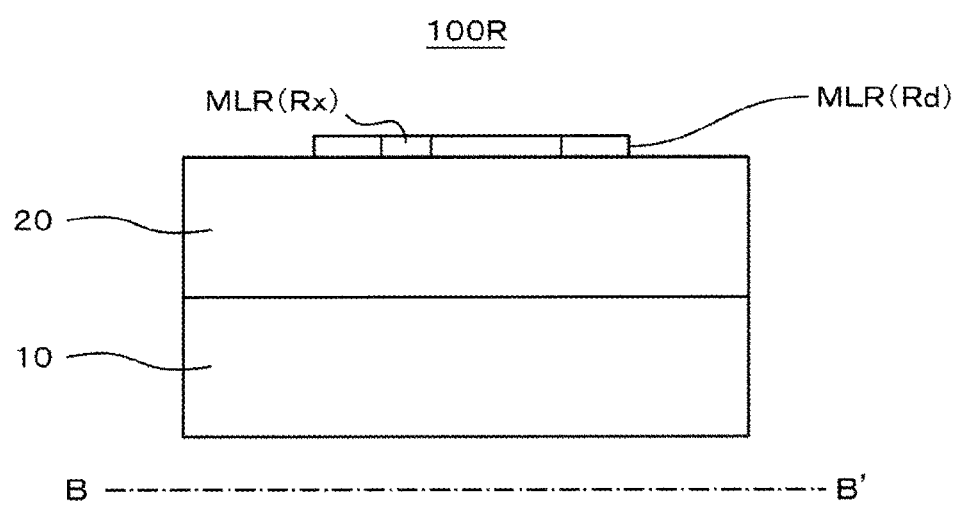
FIG. 4 is a cross-sectional view, taken along line B-B' in FIG. 3.
Figure 5:
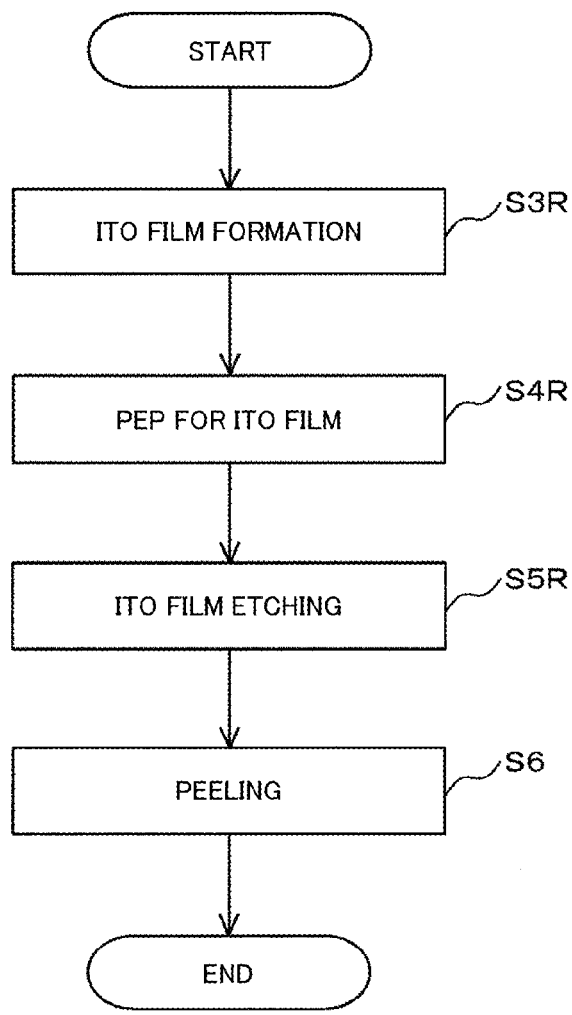
FIG. 5 is a flowchart describing a manufacturing method of the display device according to the first comparative example.

FIG. 1 is a plan view for explanation of a display device of the first comparative example. FIG. 2 is a cross-sectional view, taken along line A-A' in FIG. 1. FIG. 3 is a plan view for explanation of the display device of the first comparative example. FIG. 4 is a cross-sectional view, taken along line B-B' in FIG. 3. FIG. 5 is a flowchart for describing a manufacturing method of the display device of the first comparative example.

The display device 100R of the first comparative example includes an in-cell touch panel therein, and has an array substrate 10, a counter substrate 20, and a liquid crystal layer 30 sandwiched between the array substrate 10 and the counter substrate 20. The array substrate 10 has a glass substrate 11, a flattening film 13, and a common electrode 14, and also has thin film transistors, gate lines, drain lines, and the like, that are not shown, between the glass substrate 11 and the flattening film 13. Moreover, the array substrate 10 has pixel electrodes, an alignment film, and the like, that are not shown, between the common electrode 14 and the liquid crystal layer 30. The counter substrate 20 has a glass substrate 21 and a color filter 23. The counter substrate 20 is provided with a light shielding layer which is not shown between the glass substrate 21 and the color filter 23. Also, the counter substrate 20 is provided with an overcoat film, a spacer, and an alignment film between the color filter 23 and the liquid crystal layer 30.

As shown in FIGS. 1 and 2, the display device 100R includes scanning electrodes Tx for touch panel in the array substrate 10, while detection electrodes Rx for touch panel are arranged on the counter substrate 20 (on the viewer side thereof). The common electrode 14 formed by an ITO (Indium Tin Oxide) film inside the array substrate 10 is divided into strips, i.e., a plurality of blocks which are also used as the scanning electrodes Tx for touch panel. A wiring layer MLR formed by a transparent conductive film such as an ITO film, on the counter substrate 20 is divided into strips which are used as the detection electrodes Rx for touch panel. The sheet resistance of an ITO film is about 120 Ω/sq, which is higher than that of a metal film. Moreover, a capacitance is formed between the detection electrodes Rx and the scanning electrodes Tx, while a capacitance is formed between the scanning electrodes Tx and the flattening film 13. Therefore, the time constant of the detection electrodes Rx and the time constant of the scanning electrode Tx are large.

The shape of the detection electrode Rx is described. As shown in FIGS. 3 and 4, the wiring layer MLR is not simply rectangular, but is formed by detection electrodes Rx each having a slit (i.e., an opening with a narrow width) SLT therein and dummy electrodes Rd arranged on both sides of each detection electrode Rx with gaps. Because only a thin film can be formed by an ITO film, the wiring layer MLR is formed to have a relatively wide width for lowering its resistance. The detection electrode Rx is connected to the outside via a lead-out wiring. However, the dummy electrodes Rd are not connected to any wiring. The dummy electrodes Rd are arranged for optical and mechanical leveling.

Next, a manufacturing method of the detection electrodes of the display device according to the first comparative example is described.

An ITO film is formed on the glass substrate 21 of the counter substrate 20 (Step S3R). Then, photoresist is applied onto the ITO film and is patterned by exposure and development (this is referred to as photolithography or PEP (Photo Engraving Process)) (Step S4R). The ITO film is etched by using the photoresist as mask to be patterned, thereby the wiring layer MLR is formed (Step S5R). Finally, the photoresist is peeled off (Step S6R), so that the wiring layer MLR of the detection electrodes are obtained. Subsequently, cell cutting, cleaning, and bonding of a polarizer are performed.

The detection electrode Rx formed by an ITO film has a high resistance, and the detection capability thereof is degraded with the increase in the size and/or resolution. In addition, because a display panel having a cell manufactured by one drop filling technology (ODF) cannot be heated beyond about 120° C. although a display panel having a cell manufactured by vacuum filling technology can be heated to about 180° C., the ITO film cannot be sufficiently heated for being polycrystallized. Therefore, the obtained ITO film has a higher resistance, resulting in further degradation of the detection capability.

Second Comparative Example

Next, the second technique (the second comparative example) it is considered before this disclosure is described, referring to FIGS. 6 to 9. The second comparative example is the technique in which the ITO film in the first comparative example is replaced by a metal film having a low resistance.

Figure 6:
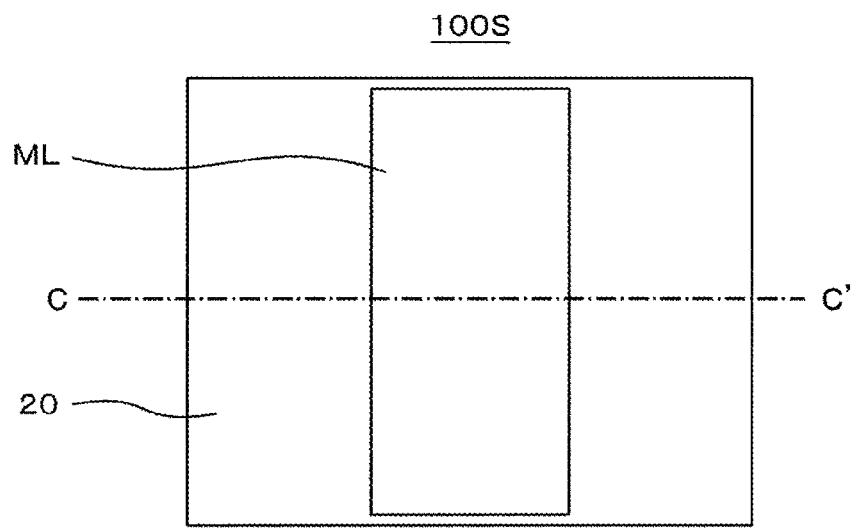
FIG. 6 is a plan view for explanation of a display device according to the second comparative example.
Figure 7:
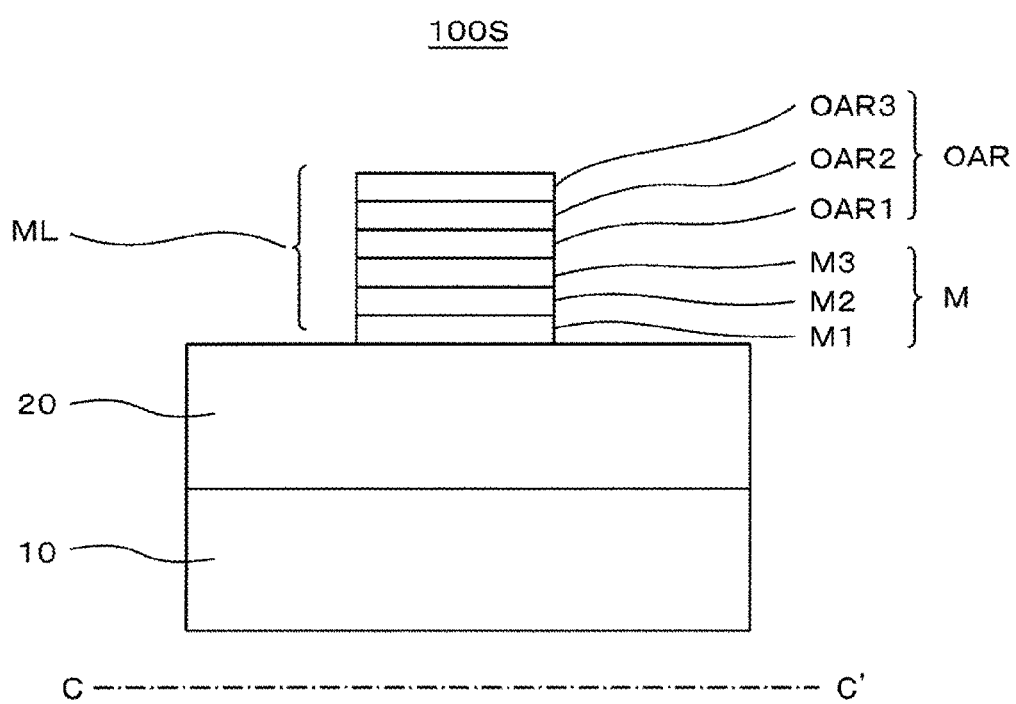
FIG. 7 is a cross-sectional view, taken along line C-C' in FIG. 6.
Figure 8:
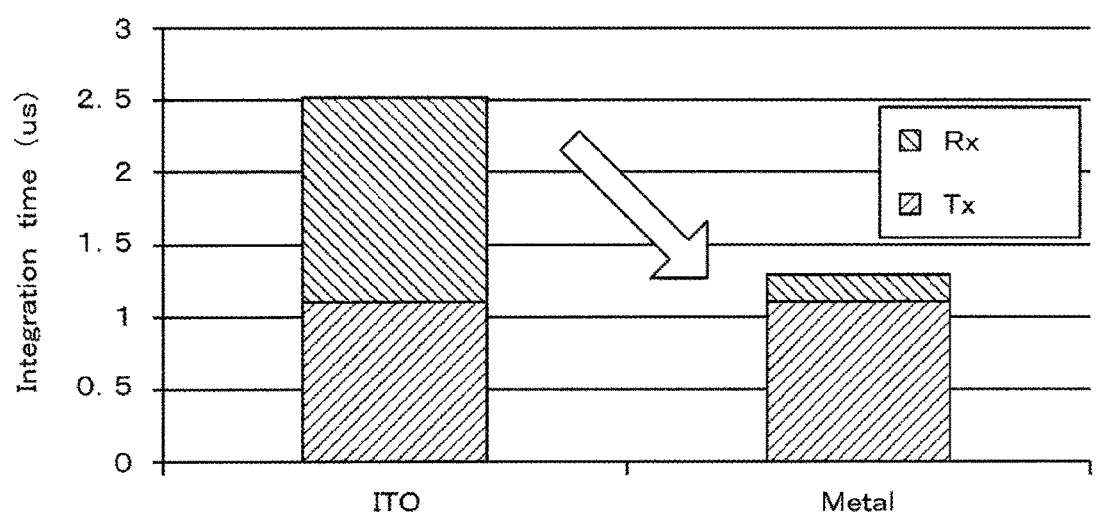
FIG. 8 shows an effect of the display device according to the second comparative example.
Figure 9:
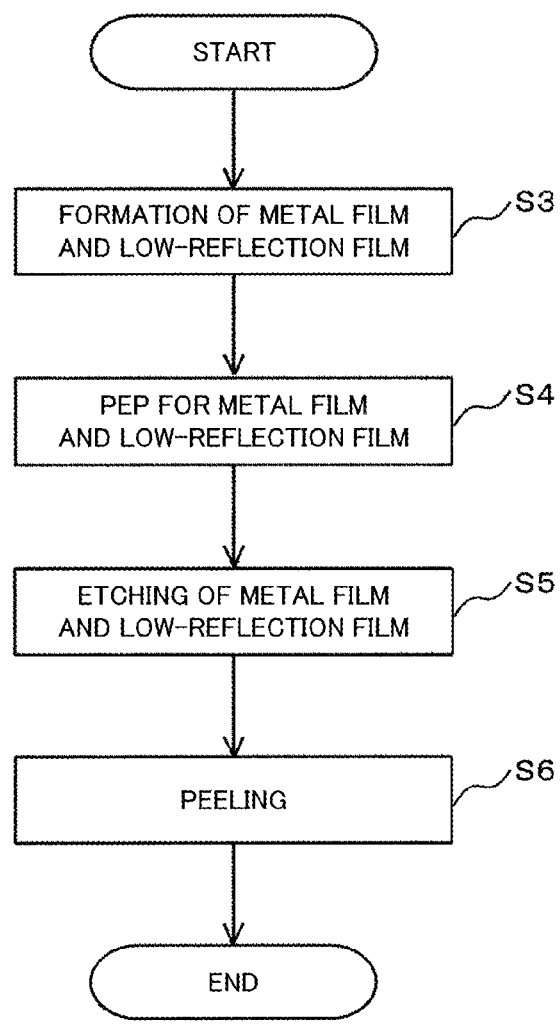
FIG. 9 is a flowchart describing a manufacturing method of the display device according to the second comparative example.

FIG. 6 is a plan view for explanation of a display device of the second comparative example. FIG. 7 is a cross-sectional view, taken along line C-C' in FIG. 6. FIG. 8 is a graph for describing an effect of the display device of the second comparative example. FIG. 9 is a flowchart for describing a manufacturing method of the display device of the second comparative example.

As described above, the detection electrodes formed by an ITO film has a high resistance, and the detection capability thereof is degraded with the increase of the size and/or resolution. Therefore, it is considered a wiring layer (detection electrodes) using a metal film in place of an ITO film. A metal layer has a relatively high reflectivity, and therefore the image contrast of a display panel may be degraded when external light is reflected by the metal layer forming the detection electrodes for touch panel. Thus, a low-reflection layer is arranged on the viewer side of the metal layer.

The display device 100S of the second comparative example includes an array substrate 10, a counter substrate 20, and a wiring layer ML which is formed by a metal layer M and a low-reflection layer OAR on the upper surface (on the opposite side to the array substrate 10) of the counter substrate 20. The metal layer M is formed by three layers including a No alloy layer M1, an Al alloy layer M2, and a Mo alloy layer M3. The low-reflection layer OAR is formed by three layers including an oxide layer OAR1, a metal alloy layer OAR2, and an oxide layer OAR3. The wiring layer ML is a layer having a function of detection electrodes for in-cell touch panel. The display device 100S is basically the same as the display device 100R of the first comparative example, except for the wiring layer ML.

The resistance of a metal film is smaller than 10 Ω/sq. Thus, as shown in FIG. 8, in a case of 7-inch screen size, for example, it is possible to improve the time constant by 48% as compared with an ITO film, by modifying the detection electrodes Rx to be formed by the metal film (shown with "Metal" in FIG. 8), in place of the ITO film (shown with "ITO" in FIG. 8). The scanning electrodes Tx are formed by an ITO film. Moreover, the width of the wiring ML formed by a metal film can be narrower than the width of the wiring MLR formed by the ITO film.

Next, the manufacturing method of the detection electrodes of the display device 100S of the second comparative example is described.

A metal film and a low-reflection film are formed on a glass substrate of the counter substrate 20 (Step S3). Then, photoresist is applied onto the metal film and the low-reflection film, and is patterned by exposure and development (Step S4). Etching is then performed using the photoresist as mask so that the metal film and the low-reflection film are patterned to form the metal layer M and the low-reflection layer OAR (Step S5). Finally, the photoresist is peeled off (Step S6), thereby the wiring layer ML of the detection electrodes is obtained.

By the above manufacturing flow, the wiring layer can be manufactured by the same process flow (FIG. 5) as that of the ITO film. However, there is a new problem. That is, the metal layer is covered with the low-reflection layer only and is softer than the ITO film. Thus, when the metal layer in this state is subjected to the subsequent processes, the metal layer may be damaged in the processes of cell cut, cleaning, and bonding of a polarizer, causing a defect such as disconnection or degradation in the appearance.

Embodiment

Figure 10:
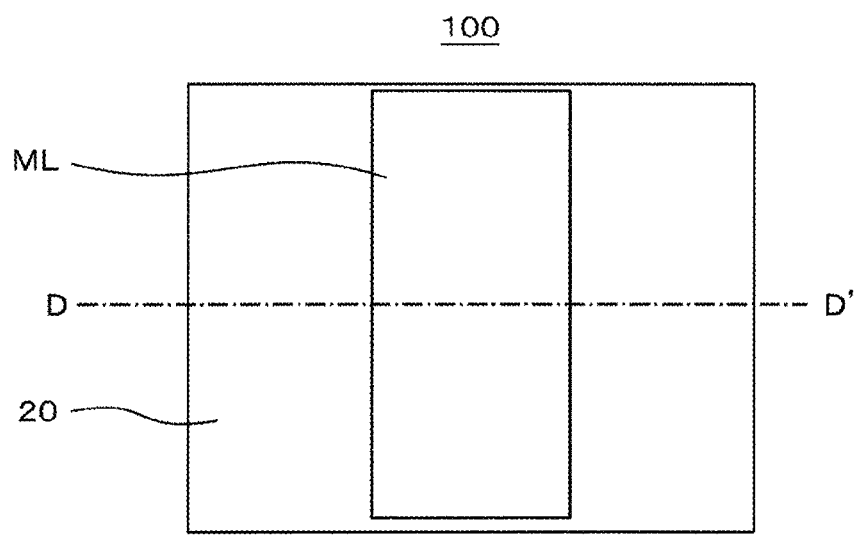
FIG. 10 is a plan view for explanation of a display device according to an embodiment.
Figure 11:
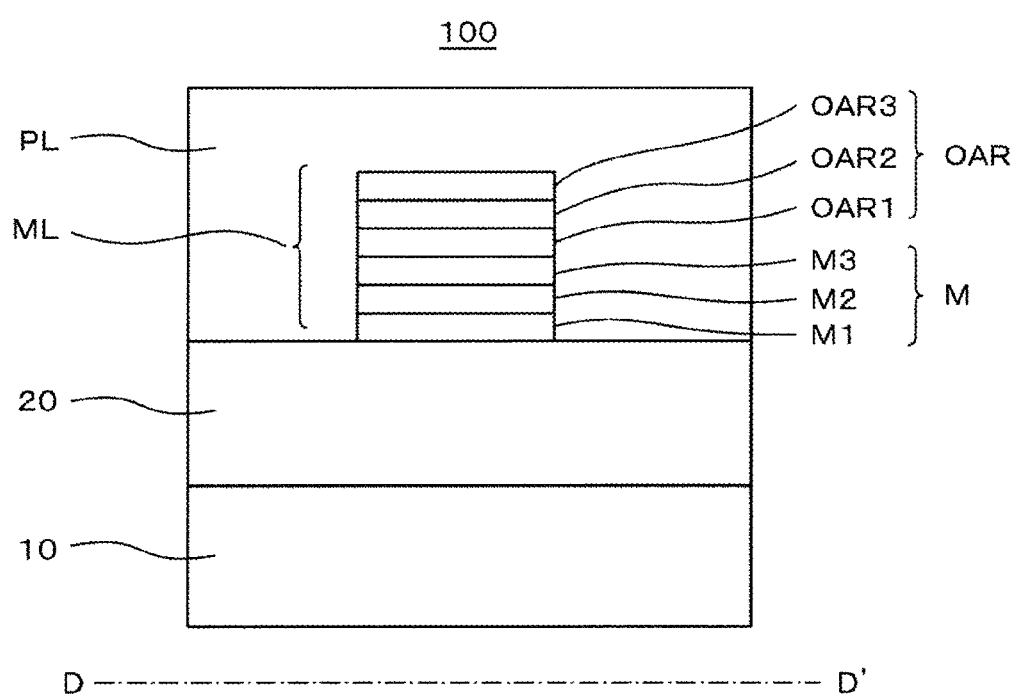
FIG. 11 is a cross-sectional view, taken along line D-D' in FIG. 10.

Next, a display device according to an embodiment is described referring to FIGS. 10 and 11.

Figure 12:
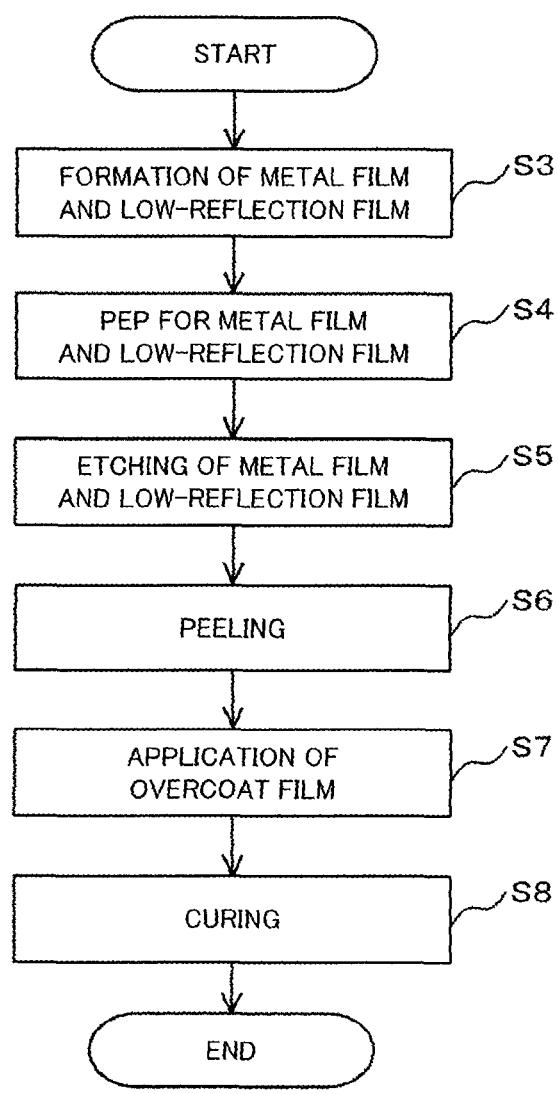
FIG. 12 is a flowchart describing a manufacturing method of the display device according to the embodiment.

FIG. 10 is a cross-sectional view for explanation of the display device according to the embodiment. FIG. 11 is a cross-sectional view, taken along line D-D' in FIG. 10. FIG. 12 is a flowchart for describing a manufacturing method of the display device according to the embodiment.

The display device 100 according to the embodiment includes an array substrate 10, a counter substrate 20, and a wiring layer ML. The wiring layer ML is formed by a metal layer M and a low-reflection layer OAR on the upper surface of the counter substrate 20 (on the opposite side to the array substrate 10). The metal layer M is formed by three layers including a Mo alloy layer M1, an Al alloy layer M2, and a Mo alloy layer M3. The low-reflection layer OAR is formed by three layers including an oxide layer OAR1, a metal alloy layer OAR2, and an oxide layer OAR3. The display device 100 is basically the same as the display device 100S of the second comparative example, except that the metal layer M and the low-reflection layer OAR are covered with a protection layer PL. The wiring layer ML is a layer having a function of detection electrodes for in-cell touch panel.

The manufacturing method of the display device 100 according to the embodiment is described.

A substrate in which the array substrate 10 and the counter substrate 20 are bonded to each other is prepared. A metal film and a low-reflection film are formed on the glass substrate of the counter substrate 20 (Step S3). Then, photoresist is applied on the metal film and the low-reflection film and is patterned by exposure and development (Step S4). Etching is then performed using the photoresist as mask, thereby the metal film and the low-reflection film are patterned to form the metal layer M and the low-reflection layer OAR (Step S5). Then, the photoresist is peeled off (Step S6), so that the wiring layer ML of detection electrodes is obtained. Moreover, an overcoat film is applied onto the wiring layer ML (Step S7). The overcoat film is cured (Step S8).

For reducing the damages of liquid crystal and a sealing member, it is preferable to use organic material that can be cured at a temperature of 150° C. or less for the overcoat film. For eliminating the damages of the liquid crystal and the sealing member, it is more preferable to use organic material that can be cured at a temperature of 120° C. or less for the overcoat film. When a light and heat curable material is used for the overcoat film, a sufficient level of hardness (corresponding to pencil hardness of 4H or higher) and a sufficient level of adhesion (no peeling is caused by aqueous washing) can be obtained by heating at a temperature of 120° C. or less.

Example

The structure of a display device according to an example is described, referring to FIGS. 13 to 17.

Figure 13:
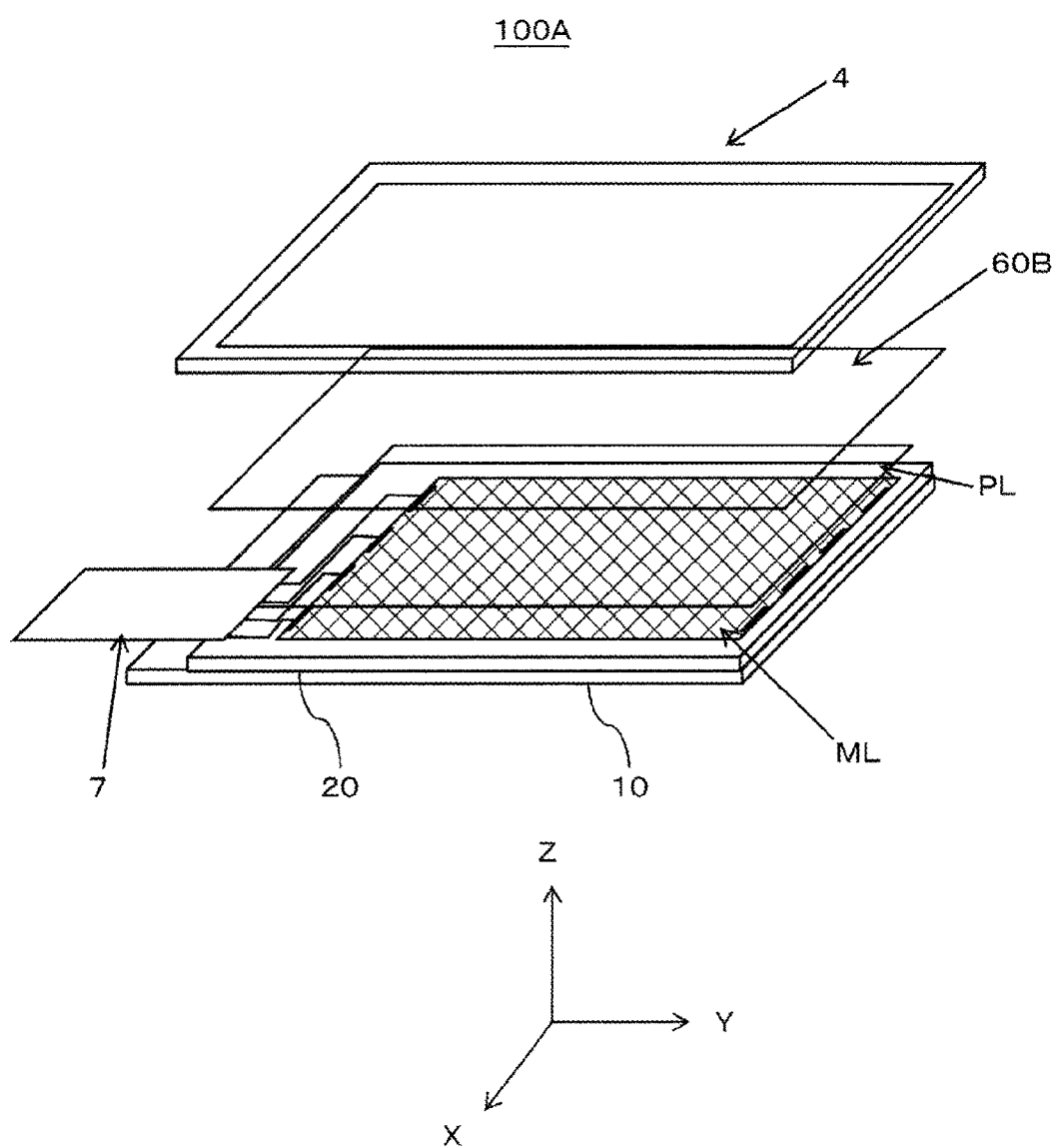
FIG. 13 is an exploded perspective view for explanation of a display device according to an example.
Figure 14:
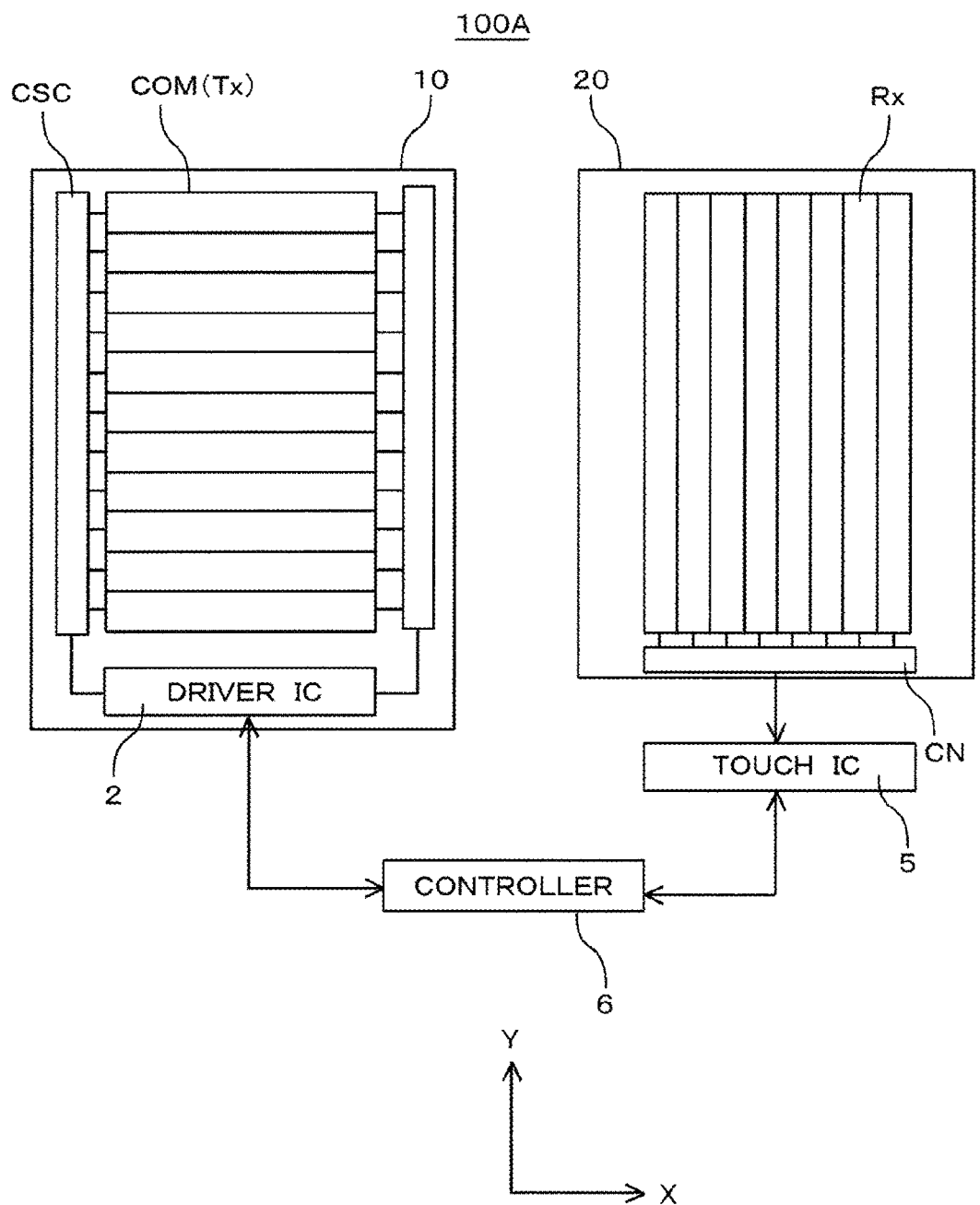
FIG. 14 is a plan view for explanation of the display device according to the example.
Figure 15:
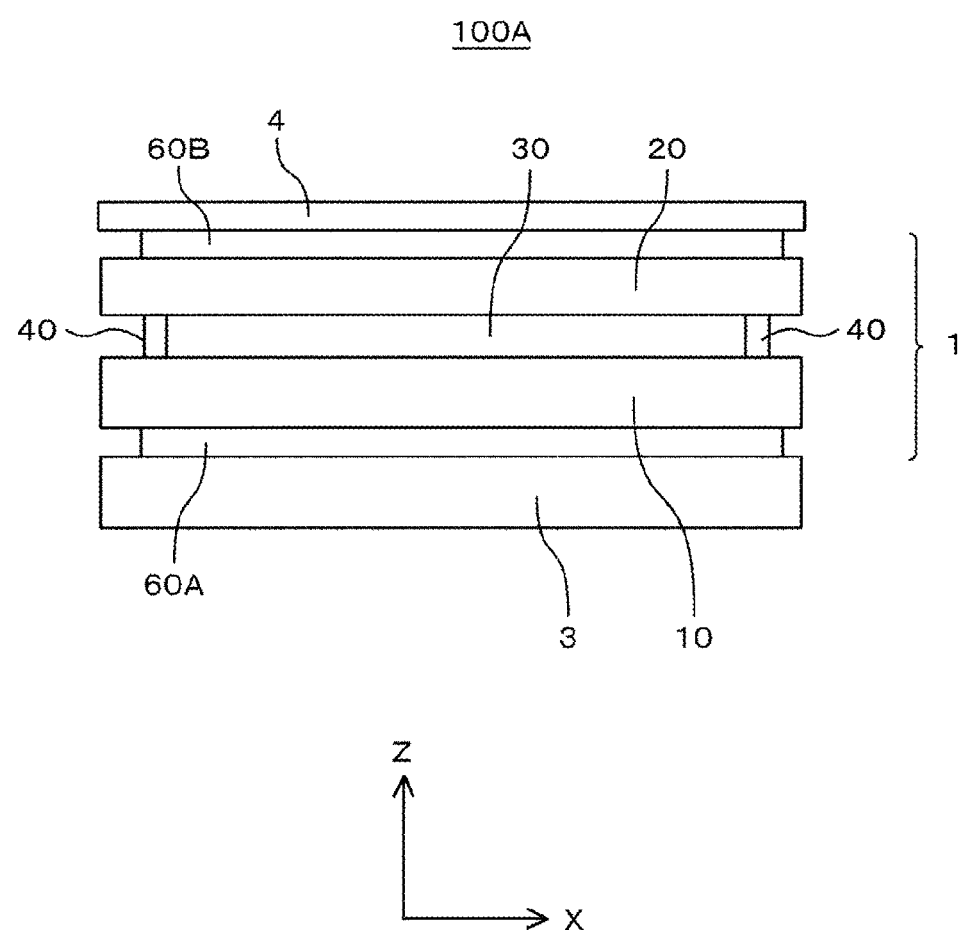
FIG. 15 is a cross-sectional view for explanation of the display device according to the example.
Figure 16:
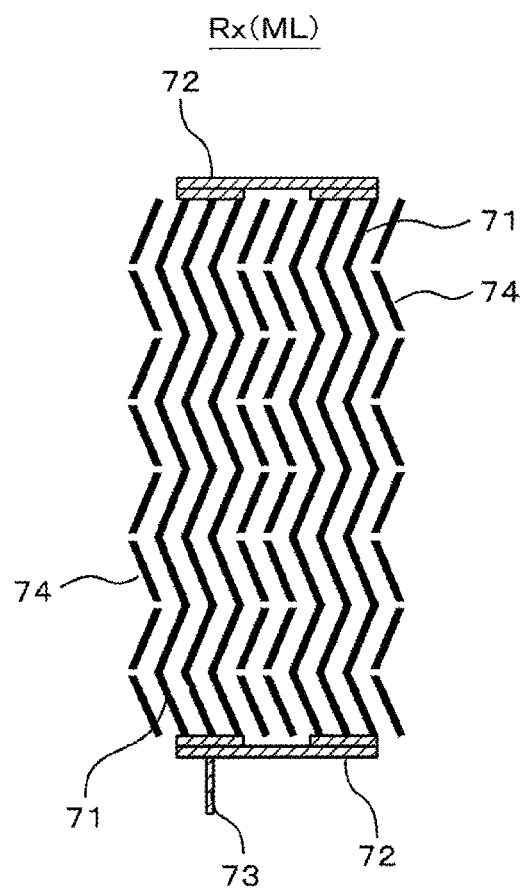
FIG. 16 is a plan view for explanation of an electrode pattern of the display device according to the example.
Figure 17:
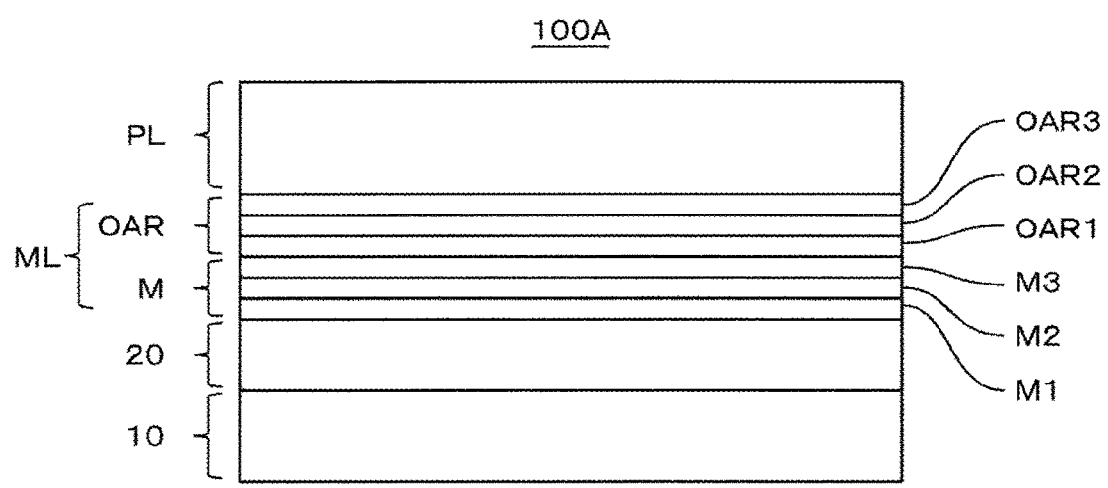
FIG. 17 is a cross-sectional view for explanation of the display device according to the example.

FIG. 13 is an exploded perspective view for explanation of the display device according to the example. FIG. 14 is an exploded plan view for explanation of the display device according to the example. FIG. 15 is a cross-sectional view for explanation of the display device according to the example. FIG. 16 is a plan view for explanation of an electrode pattern of the display device according to the example. FIG. 17 is a cross-sectional view for explanation of the display device according to the example.

The display device 100A according to the example includes a display panel 1, a driver IC (DRIVER IC) 2, a backlight 3, a cover glass 4, a touch IC (TOUCH IC) 5, a control circuit (CONTROLLER) 6, and a flexible printed circuit board (or Flexible Print Circuit: FPC) 7. Each of the driver IC 2 and the touch IC 5 is configured by a CMOS circuit on one silicon substrate. The driver IC 2 is mounted on the array substrate 10 using COG (Chip On Glass) technology. The driver IC 2 includes a source driving circuit, and controls a common scanning circuit CSC and a gate scanning circuit that is not shown to perform scanning for display (writing to pixels) and detection of a touch. The touch IC 5 includes an integration circuit, an A/D conversion circuit, a memory, and a CPU that are not shown, for example, and detects the change of the capacitance caused by the touch via detection electrodes Rx and a connection unit CN. The control circuit 6 controls the driver IC and the touch IC 5.

The display panel 1 includes an array substrate 10, a counter substrate 20, liquid crystal 30, a sealing member 40, and polarizers 60A and 60B. The array substrate 10 has common electrodes COM and the common scanning circuit CSC. The array substrate 10 also has a glass substrate, pixel electrodes, thin film transistors (TFTs), and a gate line scanning circuit that are not shown, for example. The common electrodes COM extend in X-direction and also work as scanning electrodes Tx for touch panel. The common electrodes COM are formed by an ITO film. By providing an auxiliary wiring formed of pure or alloy metal such as Al, Mo, or Ti, for the ITO film, it is possible to reduce the time constant of the scanning electrodes Tx. The common scanning circuit CSC is formed by TFTs and performs driving and scanning of the common electrodes COM (scanning electrodes Tx). The counter substrate 20 has a light-shielding layer, a color filter, and the like on a glass substrate. The liquid crystal 30 is arranged in a space formed by the array substrate 10, the counter substrate 20, and the sealing member 40. The polarizer 60A is arranged between the array substrate 10 and the backlight 3, while the polarizer 60B is arranged between the counter substrate 20 and the cover glass 4. Please note that the common electrodes COM are not limited to the ones provided in the array substrate 10. In a vertical electric field type, for example, the common electrodes COM are provided in the counter substrate 20 and also work as the scanning electrodes Tx for touch panel.

Detection electrodes Rx for touch panel (wiring layer ML) extends in Y-direction, and are arranged between the counter substrate 20 and the polarizer 60B. The detection electrodes Rx are formed on the glass substrate of the counter substrate 20, and one detection electrode Rx includes a plurality of narrow wirings 71, connection wirings 72 connecting the narrow wirings 71 to the counter substrate 20, a lead-out narrow wiring 73 connecting to the connection unit CN, and dummy narrow wirings 74 not contributing to detection. The dummy narrow wirings 74 are not connected to the connection wirings 72. The dummy narrow wirings 74 are provided for optical and mechanical levelling. Please note that the narrow wirings 71 and the dummy narrow wirings 74 are arranged in zigzag patterns for avoiding interference with the light-shielding layer of the counter substrate 20.

The display device 100A includes the array substrate 10, the counter substrate 20, the wiring layer ML, and a protection layer PL. The wiring layer ML is formed by a metal layer M and a low-reflection layer OAR on the upper surface of the counter substrate 20 (on the opposite side to the array substrate 10). The metal layer M is formed by three layers including a Mo alloy layer M1, an Al alloy layer M2, and a Mo alloy layer M3. The low-reflection layer OAR is formed by three layers including an oxide layer OAR1, a metal alloy layer OAR2, and an oxide layer OAR3. The metal layer ML is a layer having a function of the detection electrodes of an in-cell touch panel.

Although the common electrodes COM extend in X-direction, the extending direction is not limited thereto. The common electrodes COM may extend in Y-direction. In this case, the detection electrodes Rx have to extend in X-direction, a long lead-out wiring to the connection unit CN is required. However, because the lead-out wiring is also formed by the metal layer and the low-reflection layer, wiring delay can be reduced.

Figure 18:
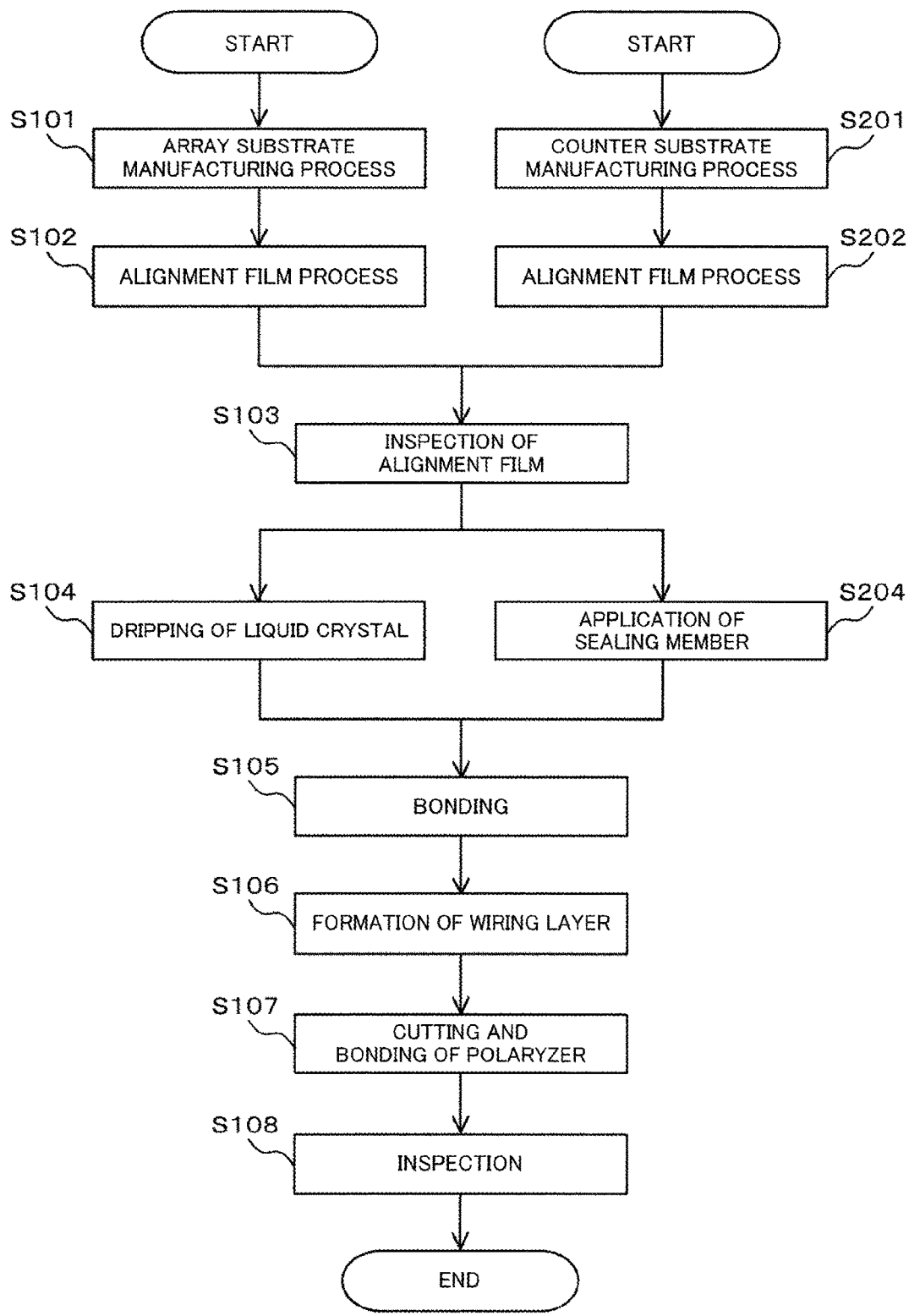
FIG. 18 is a flowchart for describing a manufacturing method of the display device according to the example.

Next, a manufacturing method of the display device according to the example is described, referring to FIG. 18.

FIG. 18 is a flowchart for describing the manufacturing method of the display device according to the example.

The manufacturing processes of the display device are classified into an array substrate manufacturing process for forming driving elements on a lower array substrate, a counter substrate manufacturing process for forming a color filter on the upper counter substrate, and a cell manufacturing process for bonding the array substrate and the counter substrate to each other.

First, by the array substrate manufacturing process, a plurality of gate lines and a plurality of data lines, which are arranged on a lower substrate to define pixel regions, are formed, and in each pixel region a thin film transistor that is a driving element connected to the corresponding gate line and the corresponding data line is formed (Step S101). Moreover, by the array substrate manufacturing process, pixel electrodes each of which is connected to the corresponding thin film transistor and drives the liquid crystal layer by being supplied with a signal via the corresponding thin film transistor, and the common electrodes are formed. In a case of manufacturing a liquid crystal display device of a vertical electric field type, the common electrodes are formed on an upper substrate in which the color filter is formed by the counter substrate manufacturing process. The color filter may be formed in the array substrate.

By the counter substrate manufacturing process, a light-shielding layer and a color filter layer formed by red, green, and blue color filters are formed on the upper substrate (Step S201). Moreover, by the counter substrate manufacturing process, spacers for keeping the cell gap uniform are formed.

Then, an alignment film is applied on each of the upper substrate and the lower substrate, and thereafter the alignment film is subjected to an orientation process for providing an orientation regulating force or a surface fixing force (i.e., a pre-tilt angle and an orientation direction) to liquid crystal molecules in the liquid crystal layer to be formed between the upper substrate and the lower substrate (Steps S102 and S202). In the orientation process, rubbing or photo-orientation technology can be applied.

The upper substrate and the lower substrate for which the alignment film process is finished are subjected to inspection for a defect of the alignment film by an alignment film tester (Step S103).

A predetermined seal pattern is formed by a sealing member on the upper substrate, while liquid crystal is dropped onto the lower substrate to form the liquid crystal layer (Steps S104 and S204). In this dropping technology, the liquid crystal is dropped by means of a dispenser and is distributed in the image display region on the first mother substrate (lower substrate) having a large area in which a plurality of array substrates are arranged or the second mother substrate (upper substrate) in which a plurality of counter substrates are arranged, and the liquid crystal is uniformly distributed over the entire image display region by a pressure for bonding the first mother substrate and the second mother substrate to each other, thereby the liquid crystal layer is formed. Therefore, in a case of forming the liquid crystal layer in the display panel by the dropping technology, the seal pattern is formed in a closed shape surrounding the outline of the image display region for preventing the liquid crystal from leaking to the outside of the image display region.

A pressure is applied to the lower substrate on which the liquid crystal is dropped and the upper substrate with the sealing member applied thereonto, while both the substrates are aligned with each other, so that both the substrates are bonded to each other with the sealing member and the dropped liquid crystal is caused to spread uniformly over the entire panel (Step S105). Then, the wiring layer of the detection electrodes is formed on the upper substrate (Step S106).

By those processes, a plurality of display panels each having the liquid crystal layer are formed in the large-area mother substrates (the lower substrate and the upper substrate). Then, the mother substrates are cut so that the display panels are separated from each other, and thereafter the polarizers are bonded to the array substrates and the counter substrates, respectively (Step S107). Subsequently, each display panel is subjected to inspection (Step S108). In this manner, the display panel is manufactured.

Figure 19:
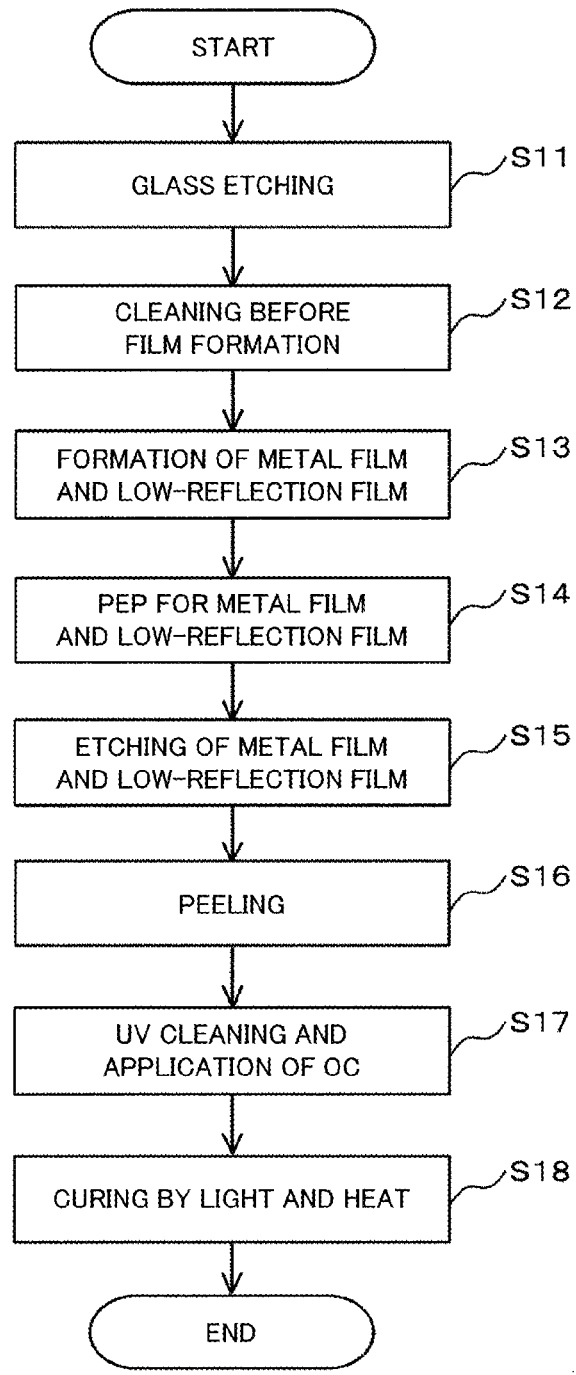
FIG. 19 is a flowchart for describing the manufacturing method of the display device according to the example.
Figure 20A:
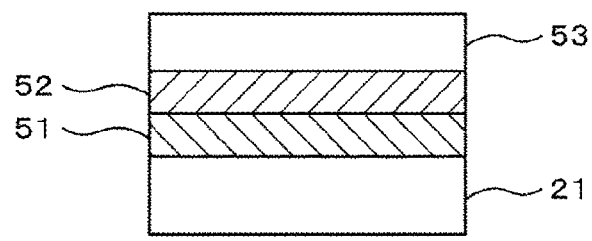
FIG. 20A is a cross-sectional view for explanation of the manufacturing method of the display device according to the example.
Figure 20B:
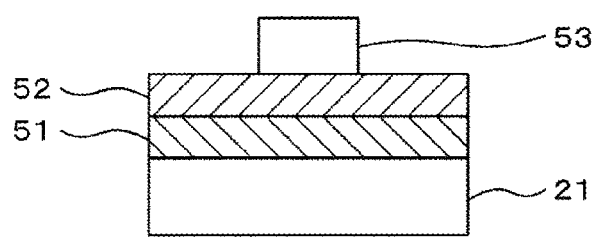
FIG. 20B is a cross-sectional view for explanation of the manufacturing method of the display device according to the example.
Figure 20C:
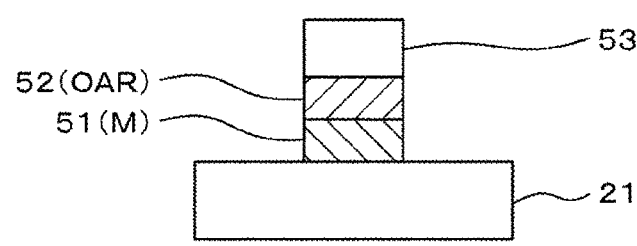
FIG. 20C is a cross-sectional view for explanation of the manufacturing method of the display device according to the example.
Figure 20D:
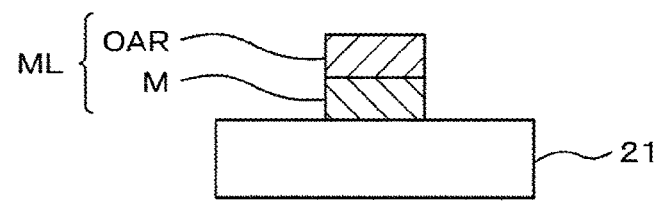
FIG. 20D is a cross-sectional view for explanation of the manufacturing method of the display device according to the example.
Figure 20E:
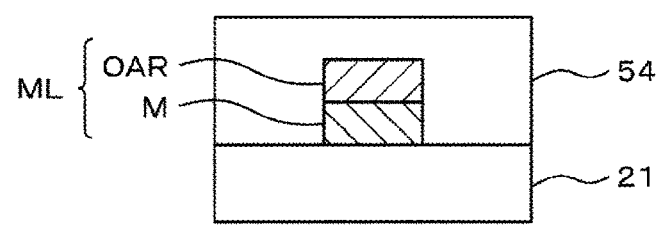
FIG. 20E is a cross-sectional view for explanation of the manufacturing method of the display device according to the example.
Figure 20F:
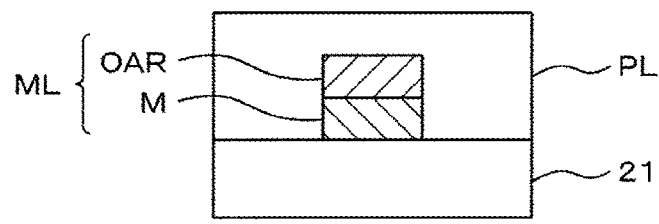
FIG. 20F is a cross-sectional view for explanation of the manufacturing method of the display device according to the example.
Figure 21:
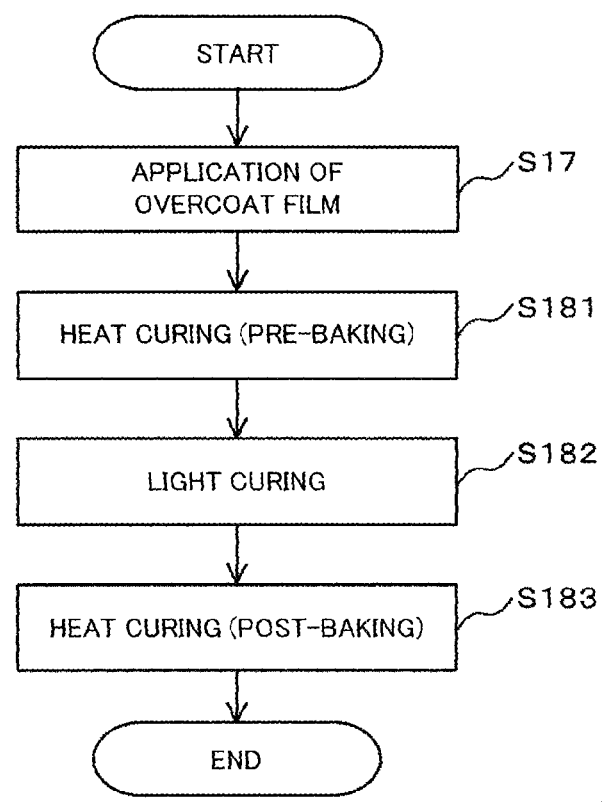
FIG. 21 is a flowchart for describing a manufacturing method of a protection layer of the display device according to the example.

The manufacturing method of the detection electrode wiring in Step S106 is described, referring to FIGS. 19 to 21.

FIG. 19 is a flowchart for describing the manufacturing method of the display device according to the example. FIGS. 20A to 20F are cross-sectional views for explanation of the manufacturing method of the detection electrode wiring according to the example. FIG. 21 is a flowchart for describing a manufacturing method of the protection layer of the display device according to the example.

A glass substrate 11 forming the array substrate 10 and a glass substrate 21 forming the counter substrate 20 are etched to be thin (Step S11) and are cleaned (Step S12). Then, a metal film 51 and a low-reflection film 52 are formed on the glass substrate 21 (Step S13). The metal film 51 is formed by three layers including a Mo alloy film M1, an Al alloy film M2, and a Mo alloy film M3. The low-reflection film 52 is formed by three layers including an oxide layer OAR1, a metal alloy layer OAR2, and an oxide layer OAR3. Photoresist 53 is then applied on the low-reflection film 52 (Step S14). The photoresist 53 is photosensitive transparent resin and has a function of an etching protection film. FIG. 20A shows a state during Step S14.

As shown in FIG. 20B, exposure using photomask that is not shown and development are performed so that the photoresist 53 is patterned (Step S14).

As shown in FIG. 20C, the metal film 51 and the low-reflection film 52 are patterned with the photoresist 53 as mask by etching using Al etchant, so that the metal layer M and the low-reflection layer OAR are formed (Step S15).

As shown in FIG. 20D, the photoresist 53 is peeled off (removed) (Step S16), to form the wiring layer ML of the detection electrodes.

As shown in FIG. 20E, after cleaning with ultraviolet light (UV), the overcoat film 54 is applied onto the glass substrate 21 and the wiring layer ML (Step S17).

As shown in FIG. 20F, the overcoat film 54 is cured by light and heat (Step S18) to form the protection layer PL.

The formation of the protection layer is described in more detail, referring to FIG. 21.

The overcoat film 54 is formed of a material that can be cured by light and heat, in which the light curing uses a radical reaction of a double-bond of an acrylic group and the heat curing reaction uses a ring-opening reaction of an epoxy group. The overcoat film 54 is preferably applied by ink-jet technology (Step S17). The molecular weight of the resin as the overcoat film 54 is preferably smaller than that of a heat curable material. Moreover, it is preferable that the overcoat film 54 contains fillers (minute particles) for increasing the hardness thereof. The overcoat film 54 preferably contains corrosion inhibitor.

Then, the overcoat film 54 is pre-baked (cured by heat) at a temperature of 90° C. to 120° C. (Step S181). Then, a laser light beam having a wavelength longer than 340 nm is radiated to the overcoat film 54 at an exposure amount of 1000 mJ/cm$^2$ or less to cause light curing (Step S182). The wavelength of the laser light beam is preferably in a range from 355 nm to 370 nm, because light having a wavelength of 340 nm or less provides a large damage to the liquid crystal. Then, the overcoat film 54 is post-baked (cured by heat) at a temperature of 120° C. for 30 minutes to 90 minutes (Step S182).

When the protection layer PL is formed in the above-described manner, the properties of the protection layer PL including adhesion, hardness, and scratch resistance are good. Good adhesion means that no peeling occurs even when the protection layer PL is soaked in hot pure water and is subjected to a cross-cut peel test. Good hardness means hardness corresponding to pencil hardness of 4H or more. Good scratch resistance means level 4 (thin scratch) or more in the steel wool rubbing test. The levels determined by the rubbing test are level 5 (no scratch), level 4 (thin scratch), level 3, (thin cloudiness in the damaged surface), level 2 (thick cloudiness in the damaged surface), and level 1 (a damage reaching the bottom surface). For the optical characteristics of the protection layer PL, transmittance for a wavelength of 400 nm is 95% or more. In a case of a light curable material, when the hardness is increased, the film stress is increased too much and therefore the adhesion is not good. In a case of a heat curable material, the molecular amount of the base resin is large, and therefore a required level of hardness cannot be obtained. For obtaining the hardness, the cross-link density has to be increased. However, as the molecular amount increases, the cross-link density is reduced.

Since the overcoat film can be cured at a temperature of 120° C. or less, it is possible to prevent the liquid crystal and the sealing member from being damaged and is also possible to form a metal layer and a protection layer even in a display panel having a cell manufactured by using ODF.

What is claimed is:

1. A manufacturing method of a display device comprising:
   (a) arranging liquid crystal between an array substrate and a counter substrate;
   (b) forming a metal layer and a low-reflection layer on the counter substrate after the step (a);
   (c) forming detection electrodes including a plurality of narrow wirings arranged in zigzag patterns, connection wirings connecting the narrow wirings to the counter substrate, a lead-out narrow wiring connecting to a connection unit and dummy narrow wirings by processing the metal layer and the low reflection layer;
   (d) applying an overcoat film on the metal layer and the low-reflection layer; and
   (e) curing the overcoat film to form a protection layer.

2. The manufacturing method of the display device according to claim 1, wherein the step (e) cures the overcoat film at a temperature of 150° C. or less.

3. The manufacturing method of the display device according to claim 1, wherein the step (e) cures the overcoat film at a temperature of 120° C. or less.

4. The manufacturing method of the display device according to claim 1, wherein the step (e) cures the overcoat film by light and heat.

5. The manufacturing method of the display device according to claim 4, wherein the step (e) includes:
   (e1) baking the overcoat film;
   (e2) radiating a laser light beam to the overcoat film;
   (e3) baking the overcoat film.

6. The manufacturing method of the display device according to claim 5, wherein the step (e1) bakes the overcoat film at a temperature from 90° C. to 120° C.

7. The manufacturing method of the display device according to claim 5, wherein the step (e2) radiates the laser light beam having a wavelength longer than 340 nm to the overcoat film at an exposure amount of 1000 mJ/cm$^2$ or less.

8. The manufacturing method of the display device according to claim 5, wherein the step (e2) radiates the laser light beam having a wavelength from 355 nm to 370 nm to the overcoat film at an exposure amount of 1000 mJ/cm$^2$ or less.

9. The manufacturing method of the display device according to claim 5, wherein the step (e3) bakes the overcoat film at a temperature of 120° C. for 30 minutes or longer.

10. The manufacturing method of the display device according to claim 1, wherein the overcoat film is light and heat curable.

11. The manufacturing method of the display device according to claim 1, wherein the step (a) arranges the liquid crystal by one drop filling technology.

12. The manufacturing method of the display device according to claim 1, further comprising the step of
   (f) bonding a polarizer onto the protection layer.

13. The manufacturing method of the display device according to claim 1, wherein the metal layer is formed by a Mo alloy layer, an Al alloy layer, and another Mo alloy layer.

14. The manufacturing method of the display device according to claim 1, wherein the low-reflection layer is formed by an oxide layer, a metal alloy layer, and another oxide layer.

15. A display device comprising:
an array substrate having pixel electrodes;
a counter substrate having a glass substrate;
a liquid crystal layer sandwiched between the array substrate and the counter substrate;
a polarizer;
detection electrodes for touch panel arranged between the glass substrate and the polarizer; and
a protection layer covering the glass substrate and the detection electrodes,
wherein
the detection electrodes are formed by a metal layer and a low-reflection layer, and the protection layer is formed of a light and heat curable resin, and
the detection electrodes comprise a plurality of narrow wirings arranged in zigzag patterns, connection wirings connecting the narrow wirings to the counter substrate, a lead-out narrow wiring connecting to a connection unit and dummy narrow wirings.

16. The display device according to claim 15, wherein the protection layer has hardness corresponding to pencil hardness of 4H or more.

17. The display device according to claim 16, wherein the protection layer has such a level of adhesion that no peeling of the protection layer occurs in a cross cut peel test.

18. The display device according to claim 17, wherein the protection layer has scratch resistance of level 4 (thin scratch) or more in a steel wool rubbing test.

19. The display device according to claim 18, wherein the metal layer is formed by a Mo alloy layer, an Al alloy layer, and another Mo alloy layer, and
the low-reflection layer is formed by an oxide layer, a metal alloy layer, and another oxide layer.

20. The display device according to claim 19, wherein the array substrate has common electrodes formed by an ITO film, and
the common electrodes also act as scanning electrodes for touch panel.

* * * * *